O. F. PHILLIPS & M. H. McCANLON.
ROAD DRAG AND GRADER.
APPLICATION FILED MAY 13, 1909.
961,007.
Patented June 7, 1910.
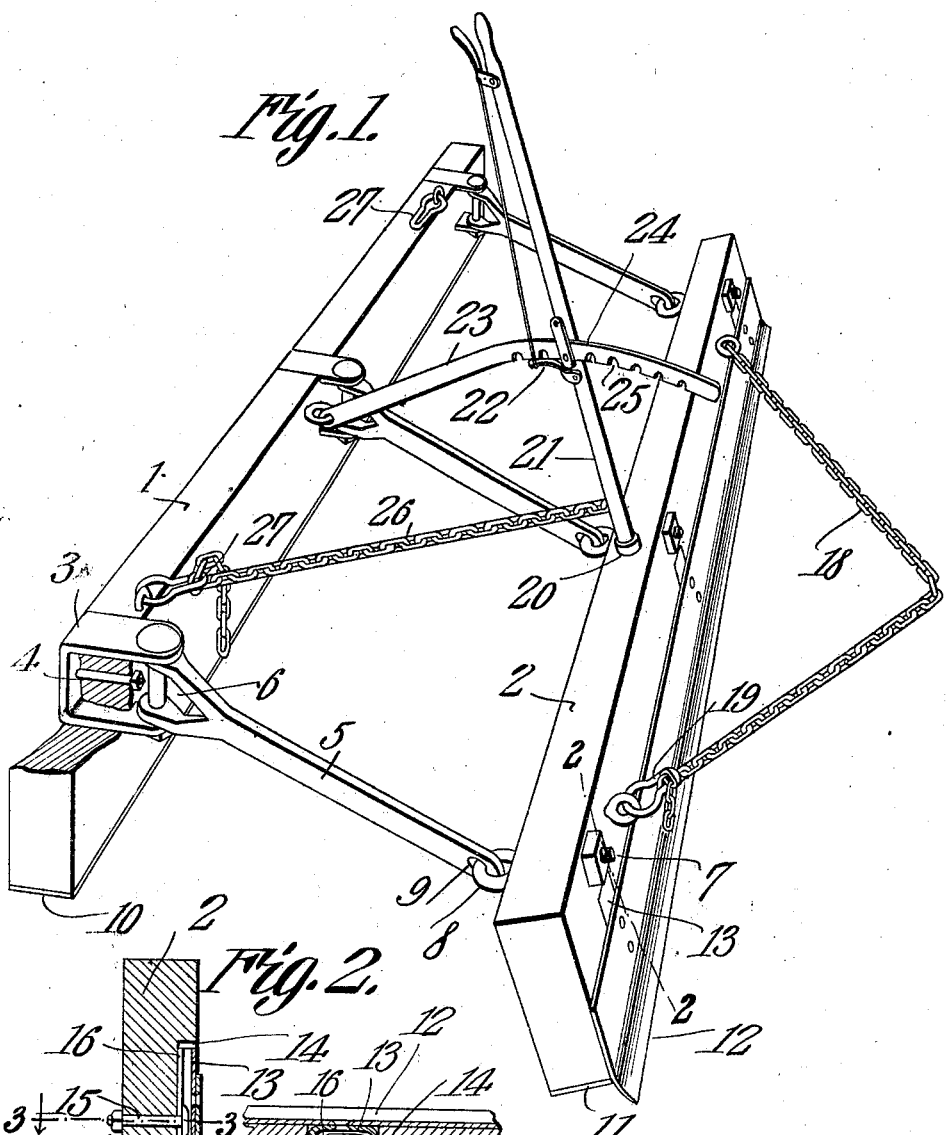
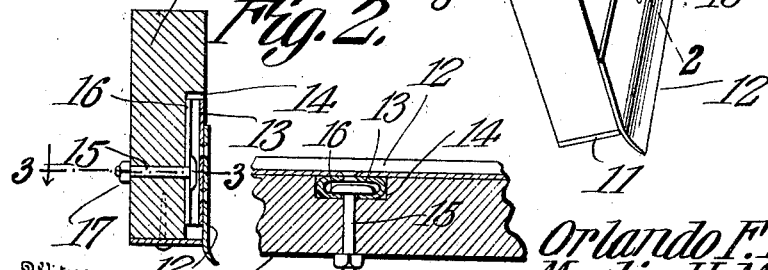
Witnesses
Inventors
Orlando F. Phillips and
Martin H. McCanlon
By C. A. Snow & Co.
Attorneys

UNITED STATES PATENT OFFICE.

ORLANDO F. PHILLIPS AND MARTIN H. McCANLON, OF BUTLERVILLE, INDIANA.

ROAD DRAG AND GRADER.

961,007. Specification of Letters Patent. Patented June 7, 1910.

Application filed May 13, 1909. Serial No. 495,650.

*To all whom it may concern:*

Be it known that we, ORLANDO F. PHILLIPS and MARTIN H. McCANLON, citizens of the United States, residing at Butlerville, in the county of Jennings, State of Indiana, have invented a new and useful Road Drag and Grader, of which the following is a specification.

This invention has relation to road drags and graders and it consists in the novel construction and arrangement of its parts, as hereinafter shown and described.

The object of the invention is to provide an implement of the character indicated, which may be readily transformed from a drag into a grader and vice versa, and which is provided with adjusting means of special construction and arrangement whereby the different parts may be so positioned with relation to each other as to effectually perform the service to be rendered.

In the accompanying drawings:—Figure 1 is a perspective view of the road drag and grader with parts in section. Fig. 2 is a transverse sectional view of the forward bar of the implement cut on the line 2—2 of Fig. 1. Fig. 3 is a horizontal sectional view of a portion of the forward bar of the implement cut on the line 3—3 of Fig. 2.

The road drag and grader consists of a rear bar 1 and a forward or front bar 2. The said bars are maintained in parallel relation, but means is provided whereby they may be adjusted longitudinally with relation to each other, as will hereinafter appear. A series of U-shaped clips 3 pass transversely through the rear bar 1, and are held in position by means of securing bolts 4. Arms 5 are bifurcated as at 6 at their rear ends and are pivotally connected with the forward portions of the clips 3. Bolts 7 pass transversely through the forward bar 2 and are provided at their rear ends with eyes 8 which pass through openings 9 provided in the forward ends of the arms 5. The implement may be provided with any number of arms 5, but, for the purpose of illustration, three are shown in Fig. 1 of the drawings. A plate 10 is secured to the under edge of the rear bar 1, and a plate 11 is secured to the under edge of the forward bar 2. A blade 12 is adjustably mounted upon the forward surface of the forward bar 2, and the said blade is provided at intervals with a series of guides 13, mounted upon its rear face. The said guides are located in recesses 14, provided in the forward portion of the front bar 2. Bolts 15 pass transversely through the forward bar 2 and have their heads in engagement with flanges 16 provided at the opposite sides of the guides 13. Nuts 17 are screw-threaded upon the bolts 15, and it is obvious that by this arrangement by loosening the nuts, the guides 13 may be slipped longitudinally under the heads of the bolts 15, and thus means is provided for adjusting the blade 12 upon the forward surface of the bar 2. The lower edge portion of the blade 12 is forwardly curved, as indicated in Fig. 1 of the drawings. A draft chain 18 is attached at one end to the forward bar 2, and at its opposite end engages a take-up link 19, which is also attached to the said forward bar 2. By this arrangement it is obvious that the said chain 18 may be lengthened or shortened, as desired. The forward bar 2 is provided with a socket 20, which opens in the surface of the upper side of the said bar. The lower end of a rod 21 is normally located in the socket 20, and the said lever is provided with a pawl mechanism 22. An arm 23 is pivotally connected at its rear end with the rear bar 1, and is provided with an arcuate portion 24, the under edge of which is provided with notches 25. A stay chain 26 is connected at its forward end with the forward bar 2, and at its rear end is adjustably connected with a take-up link 27, which is mounted upon the rear bar 1. By this arrangement it will be observed that the ends of the bars 1 and 2 may occupy the same vertical plane, and that, by shifting the forward bar so that the lower edge of the blade 12 will be elevated above the ground, the implement may be drawn in a straightforward direction, and will thus serve as a drag for pulverizing or leveling the surface of the soil. It will also be seen that by adjusting the stay-chain 26 with relation to the take-up link 27, the said bars 1 and 2 may be moved longitudinally with relation to each other and may be caused to assume the relative positions, as shown in Fig. 1, in which position the implement also serves as a drag. If desired, the stay-chain 26 may be disconnected from that take-up link 27 with which it is in connection, as shown in Fig. 1; and connected with the other take-up 27, when the positions of the said bars 1 and 2 will be reversed. When it is desired to use the implement as a grader, the rod 21 is swung so that the forward bar 2 assumes a vertical position, when the lower edge of the blade 12 will be brought in contact with the surface of the ground, and, consequently, as the implement is drawn in a straightforward direction the said blade will loosen the soil, while the bar 1 will have a tendency to pulverize and level the same. When the implement is used as a grader, the said bars 1 and 2 may be shifted longitudinally and secured with relation to each other, in the manner as above indicated.

Having described the invention, what we claim as new and desire to secure, by Letters Patent, is:—

1. An implement as described comprising a plurality of bars, arms pivotally connecting the bars together, a chain attached to the forward bar, and take-up links attached to the rear bar at points in the vicinity of the opposite ends thereof and adapted to receive said chain.

2. An implement as described comprising a forward and a rear bar, arms pivotally connecting the said bars together, a notched arm pivotally attached to the rear bar and having a curved forward portion, a rod fixed to the forward bar and having a pawl mechanism adapted to engage the notches of the said notched bar.

3. An implement as described comprising a forward and a rear bar, arms pivotally connecting the bars together, a stay-chain attached to the forward bar and adjustably connected with the rear bar, an arm pivoted to the rear bar and having a curved notched forward portion, a rod attached to the forward bar and having a pawl for engagement with the notches of the said notched arm.

4. In an implement as described a bar having vertically disposed recesses, a blade having guides located in the said recesses, said guides having inwardly turned flanges, and bolts passing transversely through the bar and having their heads located in the said guides and adapted to bear against the said flanges, and securing devices engaging the said bolts.

In testimony that we claim the foregoing as our own, we have hereto affixed our signatures in the presence of two witnesses.

ORLANDO F. PHILLIPS.
MARTIN H. McCANLON.

Witnesses:
J. EMERSON RINE,
MILTON M. VAWTER.